United States Patent Office 3,028,156
Patented Apr. 3, 1962

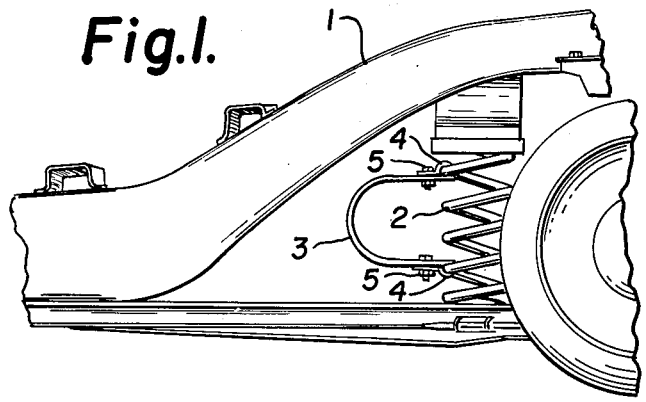
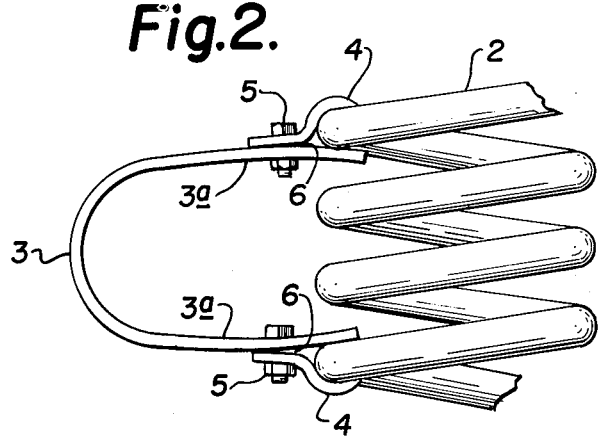
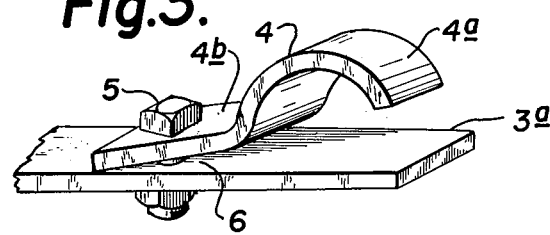

3,028,156
VEHICLE HELPER AND STABILIZING SPRING
John A. Roehrig, 311 Field Club Ridge Road,
Pittsburgh, Pa.
Filed Apr. 28, 1960, Ser. No. 25,469
3 Claims. (Cl. 267—28)

This invention relates to a helper spring for attachment to coil spring suspensions of cars, trucks and other vehicles and which is useful for the purpose of restoring sagged coil springs to their original height and for the further purpose of providing additional strength to carry loads, as well as to stabilize the riding qualities of vehicles, particularly when making turns.

Since coil springs tend to sag after a certain amount of use, attempts have been made in the past to overcome this tendency by inserting separating blocks and spacing elements between the coils to prevent them from coming too close together and which will contact adjacent coil turns along portions thereof or along the entire peripheries, which devices are often referred to as choke collars. While effective for checking the downward stroke of the spring, they are ineffective to provide progressive resistance to compression and utterly ineffective to check the rebound tendency of the spring—also such devices are rapidly worn, particularly when made of rubber and are rather complicated and expensive in construction, for which reasons they have not been generally accepted or adopted commercially.

An object of my invention is to provide a helper spring for vehicle spring suspensions which is devoid of the above named disadvantages and which is relatively simple in construction, also which will effectively restore a sagged coil spring to its original height and which will also provide additional strength to carry extra loads.

A further object of my invention is to provide a helper spring for coil springs in front or rear vehicle suspensions which, in addition to restoring the coil spring to its original height, will also provide progressive resistance to rebound action of the spring, whereby the coil spring on one side of the front suspension, for example, will resist compression while the helper spring on the other side thereof will resist rebound and thereby greatly stabilize the vehicle while turning corners and will provide an amazing increase of comfort in the ride so as to be even better than the ride provided by new coil springs.

A further object of the invention is to provide a helper spring which can be easily and quickly installed and removed from a coil spring as an attachment and which may be selectively clamped to any of the coils of the coil spring to provide selective resistance to tension or compression of the spring.

Other objects and advantages will become more apparent from a study of the following description taken with the accompanying drawing wherein:

FIG. 1 is a fragmentary, elevational view of a rear coil spring suspension of an automobile, showing the coil spring equipped with a helper spring embodying the principles of my invention;

FIG. 2 is an enlarged view of the coil spring and helper spring shown in FIG. 1; and, FIG. 3 is a further enlarged fragmentary view of an end portion of the helper spring shown in FIGS. 1 and 2.

Referring more particularly to FIG. 1 of the drawing, numeral 1 denotes a rear frame portion of an automobile and numeral 2 denotes a helical coil spring of spring metal which is supported between a saddle secured to the frame portion and a radius arm which is fastened to the bottom end of the coil spring and pivoted to the frame portion in a conventional manner.

Coil springs 2 will sag as the result of wear and thereby cause tilt of the car body, which results in hitting bottom when the car rides over an obstruction or hole in the road, as well as other disadvantages. To overcome these disadvantages, I have provided helper springs of spring steel 3, one for each coil spring 2, which helper spring is substantially U-shaped in construction and may be bent into such shape by an ordinary bolt bender. Spring 3 has arms or legs 3a which may be clamped onto either adjoining coils or every other coil, or every other two coils, of spring 2 (the latter being shown) depending upon the amount of resistance to compression and tension required. Coil springs may be of any suitable size, depending upon the particular car, truck or other vehicle on which it is used. I have found that a suitable size for the ordinary automobile is a helper spring which is about 12½ inches long, before forming about ¼ inch thick and 1¾ inches wide and which has a spacing between the legs 3a thereof before mounting of about 3½ inches and a height from the bottom of the U to the extremeties thereof of about 5 inches. Of course, these dimensions may be varied to suit the particular suspension. I have found that up to 185 lbs. or more of additional strength is provided by each helper spring 3. For greater strength, of course, the thickness may be increased.

The helper spring 3 is fastened onto the desired central coils of the coil spring 2. In the example shown two coil turns are spanned. The helper springs are attached by the use of clamps 4 which are arcuate and made of about ¼″ thick steel, and having holes in one end through which are extended bolts 5 which also extend through registering holes 6 formed in the end portions 3a of the helper spring. The helper spring is installed after the chassis is raised only a few inches above normal car height. The helper spring is positioned between the frame and radius arm.

The clamps or clips 4 may be of spring steel of about 1 inch wide and 2 inches long which can be bent into arcuate form, as shown, by an eye machine. The installation of helper springs 3 may be made in less than a half hour and is made simple by screwing two bolts on each helper spring. Thus there are no wearing parts, such as rubber bumpers and the like, such as used in other spring restoring parts, thus giving long additional life to the coil spring. The helper spring not only restores the coil spring to its original height but provides additional strength to the spring in compression so that it can carry heavier loads. A further outstanding advantage of my helper spring is that it not only resists compression of the spring, but also tension or rebound, that is, its tendency to expand, therefore it is particularly helpful in stabilizing the car when it is turning a bend or corner. More specifically, in turning a corner or bend, the helper spring on one side of the suspension is in compression because of compression of the coil, whereas that on the other side is in tension since it is resisting expansion or rebound of the coil, thus providing cumulative stabilizing effect which eliminates the see-saw motion inherent in coil spring suspended cars and will greatly improve the ride and eliminate swaying of the body or chassis. Thus the vehicle will be given a riding quality that is even superior to that when new because of the stabilizing influence or action of the helper springs.

Thus it will be seen that I have provided an efficient and highly effective helper spring for restoring coil springs in front and rear automobile suspensions, and the like, to their original height and at the same time, adding additional strength to such coil springs for resisting compression; furthermore, I have provided a helper spring which not only resists compression, but also expansion or rebound and thereby provides a stabilizing effect so as to prevent swaying of the vehicle body, such as occurs when turning corners, thus improving the riding characteristics so as to be even better than that of a new car; furthermore, I have provided a helper spring which is relatively inexpensive to manufacture and easy to install and which will enable selective addition of strength to a sagged coil spring merely by spanning a selective number of coils thereof.

While I have illustrated and described a single specific embodiment of my invention, it will be understood that this is by way of illustration only, and that various changes and modifications may be made within the contemplation of my invention and within the scope of the following claims.

I claim:

1. In a suspension mechanism for a vehicle including a coil spring having a plurality of turns for supporting part of the vehicle load, the combination therewith of a substantially U-shaped helper and stabilizing leaf spring whose central portion projects radially outwardly of the coil spring in a vertical plane extending through the axis of the coil spring and the end portions of which project between intermediate turns of said spring, arcuate shaped clamp elements secured to and extending in spaced relationship from said end portions to form a clamp therewith for clamping said leaf spring to said intermediate turns and to form spacer elements therebetween, whereby said leaf spring will aid in resisting compression and checking rebound of the coil spring.

2. In combination with a vehicle spring suspension having a coil spring on each side, a helper and stabilizing spring of spring steel and of substantially U-shape detachably fastened to intermediate turns of each of said coil springs and projecting radially outwardly thereof to aid in resisting compression and checking rebound of said coil springs, a clamp for clamping each end portion of each helper spring to vertically spaced turns of the corresponding coil spring, the end portions of said clamp and of said helper spring projecting between turns of said coil spring to serve as spacers to prevent contacting of said turns.

3. The combination as recited in claim 2 wherein each clamp is in the form of a short strip of spring steel bolted to said end portion and having an arcuate portion surrounding a portion of said vertically spaced turns to serve as a spacer between said turns to prevent contacting thereof.

References Cited in the file of this patent

UNITED STATES PATENTS

| 1,270,582 | Zalanka | June 25, 1918 |
| 1,404,458 | McClintock | Jan. 24, 1922 |
| 1,482,114 | Brewster | Jan. 29, 1924 |
| 2,603,481 | Wolze | July 15, 1952 |
| 2,924,447 | Ernest | Feb. 9, 1960 |

FOREIGN PATENTS

| 61,342 | France | Nov. 3, 1954 |